Dec. 1, 1931.  W. E. WINANS  1,834,816
MOUNTING FOR THE TOOTH REST OF CUTTER GRINDERS
Filed March 17, 1930
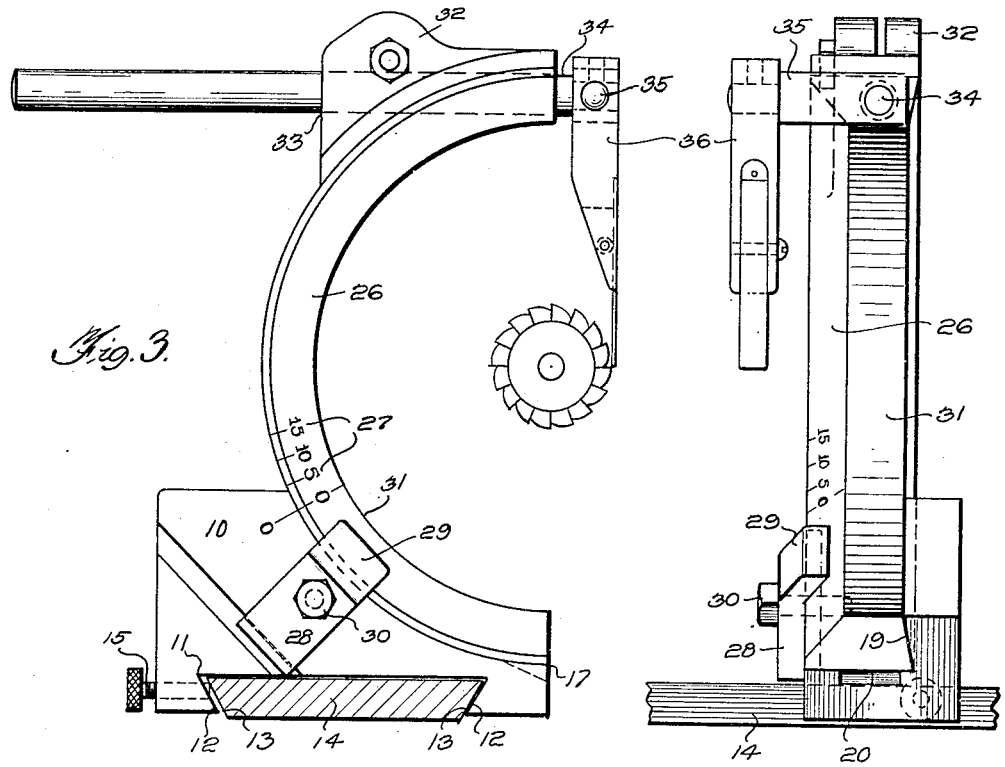
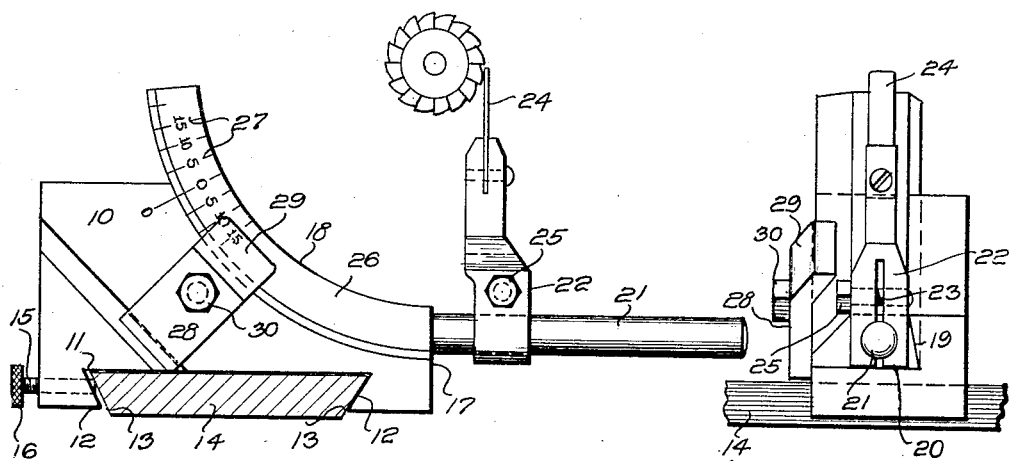
INVENTOR.
WILLIAM E. WINANS,
BY
ATTORNEY.

Patented Dec. 1, 1931

1,834,816

UNITED STATES PATENT OFFICE

WILLIAM E. WINANS, OF HARRISBURG, PENNSYLVANIA

MOUNTING FOR THE TOOTH REST OF CUTTER GRINDERS

Application filed March 17, 1930. Serial No. 436,451.

The invention is for an improved mounting for that part of tool and cutter grinders known as the tooth rest and is more applicable to a tool grinder when the grinding of a milling cutter reamer or the like is to be accomplished by the use of a cup wheel or flared cup wheel, although it may also be used advantageously with a disc wheel, using the periphery thereof for the grinding operation.

In devices of this kind as at present constructed, it is a tedious and time consuming operation to so adjust a tool with relation to the grinding element as to give the desired clearance angle to the cutting edge of the tooth of the tool being ground, it being necessary for the workman to first consult a clearance table which is usually provided by the manufacturer of the tool grinder being used, to determine the adjustment of the tooth rest with relation to the axis of the arbor on which the tool is mounted for grinding. This adjustment varies with the diameter of the tool and the clearance angle desired and is usually expressed in the clearance table in decimals of an inch, which the workman must translate into such fractional elements of an inch as may be readily measured with a machinist rule or scale, then by scale measurement he must adjust the tool rest with relation to the axis of the arbor in such manner as to properly position the work with relation to the grinding element to give the desired clearance. Not only is this mode or procedure time consuming and tedious, but is fraught with the danger of damage to a tool resulting from mal-adjustment of the tool with relation to the grinding element.

The primary object of the invention is to provide a tooth rest mounting so calibrated in degrees of angularity that the tooth rest finger per se may be readily and accurately set for grinding the tooth of a tool to any desired clearance angle, thus avoiding the necessity of consulting a clearance table or resorting to scale measurements.

It is a further object of the invention to provide a device of the character indicated which when set to impart a given angle of clearance to a tooth, may be used for imparting a clearance of like angularity to the tooth of tools of varying diameters without the necessity of re-setting.

It is a further object of the invention to provide a device of the character indicated that is adaptable to use for all standard types of tool and cutter grinders.

It is a further object of the invention to provide a device of the character indicated which is simple in construction and operation and one that can be used by an unskilled workman.

In the accompanying drawings:—

Figure 1 is a side elevation of the improved tool rest mounting.

Figure 2 is an end view thereof taken at right angles to Figure 1.

Figure 3 is a side elevation of a modified form of the invention showing the tooth rest finger supported from a point above the axis of the arbor supporting the work.

Figure 4 is an end view of Figure 3 taken at right angles thereto.

In the embodiment of the invention as illustrated in the drawings, the supporting base 10 is provided with slot 11 having inwardly beveled walls 12 for cooperation with complementary beveled walls 13 of platen 14 for longitudinal slidable movement of the base 10 on the platen 14 for adjustment longitudinally of the platen 14 of the tooth rest finger with relation to the tool to be ground. Base 10 is provided with tension screw 15 having knurled head 16 for securing the base in adjusted position with relation to the platen 14. Base 10 has an arcuate cut away portion forming slideway 17 for slidably receiving therein segment 18. The slideway 17 has inwardly sloping wall 19 which lies at an angle of less than 90° to the bottom 20 thereof, thus forming an angular seat for the complementary formed side and bottom of segment 18 for sliding movement either clockwise or contra clockwise within the slideway. Segment 18 terminates at its lower end in tooth rest supporting bar 21 which carries adjustable tooth rest base 22 from the upper end of which projects the tooth rest supporting finger per se 24. The lower portion of the tooth rest supporting base 22 is split as at 23 for the adjustment inwardly or outwardly of the tooth rest finger per se 24 on the arm 21 by means of tension screw 25. The tooth rest finger per se 24 is preferably made of a strip of machine spring steel of suitable thickness in order that it may yield when passed from one tooth to the next in adjusting the finger to the tooth to be ground. Segment 18 has downwardly and inwardly inclined face 26 which is calibrated as at 27 in degrees of angularity which indicate the degree of angularity at which the tooth of a tool will be ground when the degree on the segment is brought into registration with the zero mark on the base 10 by sliding the segment within the slideway.

Base 10 is provided with clamp 28 having downwardly and inwardly extending portion 29 conforming to the downwardly and inwardly inclined face of segment 18 for clamping the segment 18 in adjusted position by means of tension screw 30.

In Figures 3 and 4 is shown a modification of the invention as shown in Figures 1 and 2, in which the device is shown as being of an over slung type, or one in which the tooth rest supporting finger per se is supported and depends from a point above the arbor of the mandrel upon which the work is supported and in which modification of the device, the segment 31 describes the half of a circle, the upper end of which is provided with a split clamping member 32 which is bored as at 33 for receiving therein in slidable movement the finger rest supporting arm 34 which carries at its outer extremity off set arm 35 for supporting the finger rest per se. Supporting arm 36 in off set relation to the arm 34 in order that the tool tooth rest supporting arm per se may be adjusted to the tooth of a tool whose radius is greater than the radius of segment 31 by so positioning base 10 on platen 14 as to clear the segment 31 by the end of the tool.

It is essential in both forms of the device that the axis of rotation of the segment shall coincide with the axis of the arbor supporting the work, such as a cutter, reamer, or the like and that it be so calibrated that at zero setting the supporting tip of the tooth rest per se shall be in the same horizontal plane with the axis of rotation of the segment.

Having thus described the invention, what is claimed is:—

1. A tooth rest mounting comprising a platen, a base having an arcuate slideway formed therein and slidable longitudinally of the platen, a calibrated segment slidable in the slideway, and an adjustable tooth rest supported by the segment.

2. A tooth rest mounting comprising a platen, an arbor supported by the platen, a base having an arcuate slideway formed therein and slidable longitudinally of the platen, a calibrated segment slidable in the slideway and a tooth rest supported by the segment and adjustable with relation to the longitudinal axis of the arbor.

3. A tooth rest mounting comprising a platen, an arcuate tooth rest supporting member slidably related to the platen, an arbor supported by the platen and concentric with the tooth rest supporting member and a tooth rest carried by the arcuate member.

4. A tooth rest mounting comprising a platen, a base having an arcuate slot therein lying transversely of the platen, said base being slidable longitudinally of the platen, an arcuate tooth rest supporting arm slidable in the slot and a tooth rest finger supported by the arm.

5. A tooth rest mounting comprising a platen, an arbor supported by the platen, an arcuate tooth rest supporting member slidably related to the platen, the axis of the slidable member and the longitudinal axis of the arbor lying in the same vertical plane, a tooth rest carried by the arcuate member and means for securing the arcuate member against slidable movement.

6. A tooth rest mounting comprising a platen, a supporting base, said base having an arcuate slideway therein, an arcuate tooth rest supporting member describing a semicircle and slidable in the slideway, a clamping member carried by the arcuate supporting member, said clamping member and said supporting member having a communicating bore extending therethrough, a tooth rest supporting rod extending through the bore, and a tooth rest finger carried by the rod.

7. A tooth rest mounting comprising a platen, a supporting base, said base having an arcuate slideway therein, an arcuate tooth rest supporting member describing a semicircle and slidable in the slideway, a clamping member carried by the arcuate supporting member, said clamping member and said supporting member having a communicating bore extending therethrough, a tooth rest supporting arm extending through the bore, an offset arm carried by the supporting arm and a tooth rest finger affixed to the offset arm.

8. A tooth rest mounting comprising a platen, a supporting base, said base having an arcuate slideway therein, an arcuate tooth rest supporting member describing a semicircle and slidable in the slideway, a clamping member carried by the arcuate supporting member, said clamping member and said supporting member having a communicating bore extending therethrough, a tooth rest supporting arm extending through the bore, an offset arm carried by the supporting arm, a tooth rest finger affixed to the offset arm and an arbor supported by the platen having its longitudinal axis concentric with the axis of the slidable member.

In testimony whereof I have hereunto set my hand.

WILLIAM E. WINANS.